F. W. COLLINS.
Hop Culture.

No. 40,792. Patented Dec. 1, 1863.

Witnesses:
Chas. E. Hore
Geo. B. Morse

Inventor:
Frederick W. Collins
By Thos. P. How Atty

UNITED STATES PATENT OFFICE.

FREDERICK W. COLLINS, OF MORRIS, NEW YORK, ASSIGNOR TO HIMSELF AND WM. H. PRATT.

IMPROVEMENT IN TRAINING HOPS.

Specification forming part of Letters Patent No. 40,792, dated December 1, 1863.

*To all whom it may concern:*

Be it known that I, FREDERICK W. COLLINS, of Morris, county of Otsego, and State of New York, have invented a new and useful Improvement in Apparatus for Training Hops; and I do hereby declare that the following is a full, clear, and exact description thereof, reference being had to the accompanying drawings, and to the letters of reference marked thereon.

My invention consists in setting a short pole in each hill of hops, which pole is of the length necessary to train the hop perpendicularly to the height at which it will commence bearing fruit, and connecting each of these poles at the top with each contiguous hill by means of horizontal twines, or their equivalent, in such a manner that the pole in each hill will be supported by its fellows, and the bearing portion of the hop trained horizontally upon the twines, by which arrangement a very great saving of expense in construction, labor of gathering, and loss of fruit by high winds is effected, and a very large gain in the yield of the fruit realized.

Figure 1:
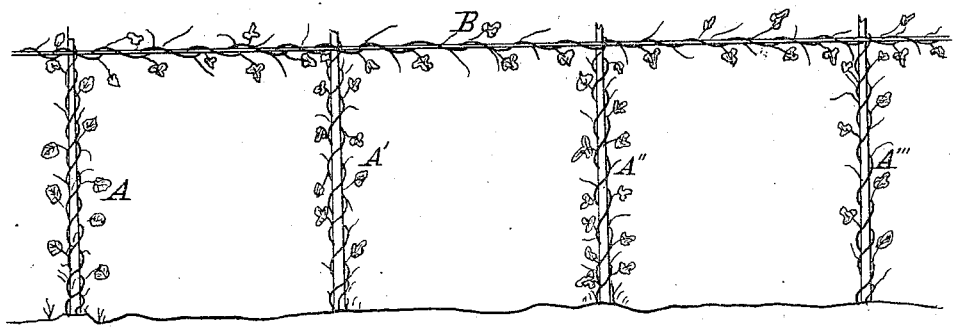
Figure 2:
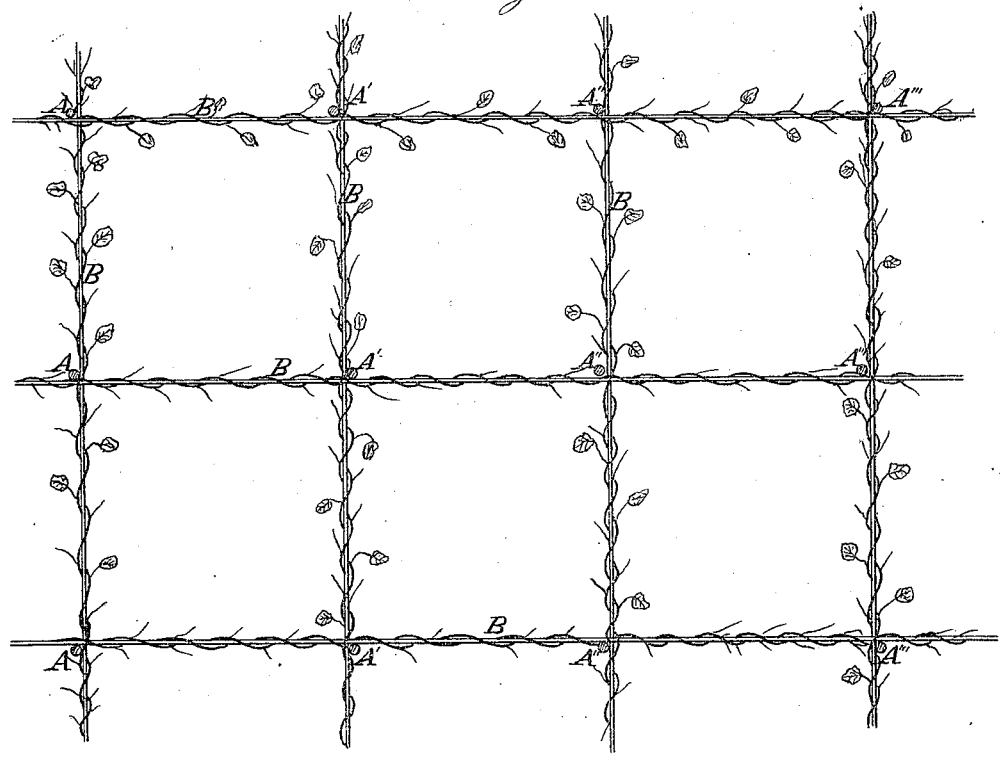

In the accompanying drawings, Figure 1 is a side elevation showing the construction of my device for training hops. Fig. 2 is a plan of the same.

A A are the poles which are set in each hill of hops. These poles are made of the proper length to train the hops to the height at which they will commence bearing, and this height will of course vary somewhat upon different soils, and consequently no exact direction can be given which would be applicable to all soils indiscriminately; but the knowledge of the general growth of the hops and of the soil upon which they are to be grown will be a sufficient guide to the user in relation to the length of the pole to be employed. To the tops of these poles I attach cords B B, which are firmly secured to the top of each pole, and connect it with the tops of the poles of each of the adjacent hills, as represented in Figs. 1 and 2. This mode of connection, it will be obvious, gives a stable and firm support to each pole, and secures to each hill of hops a firm and reliable support, which is not likely to be disturbed by high winds or any other casualty occurring during their growth. The hops will climb these poles till they arrive at the top, when, having no further upright support, they will run out in the lines B B, which I usually make of good heavy twine, though wire may be used for the same purpose, but probably not as economically. This arrangement brings the bearing portion of the hop into a horizontal position, where it receives the full effect of the rays of the sun to ripen the fruit and bring it to an early maturity, while at the same time the support is such as not to be easily affected by the wind, it being, as will be obvious, a continual support across the whole field. The yield of hops is therefore, in consequence of the advantages gained by this mode, very much greater than by the ordinary mode of training, and the expenses of construction are much less.

In the common manner of training hops poles of sufficient height to train the vine wholly in an upright direction have been generally used. As poles of that length are heavier and more scarce, consequently the expense is very much greater, and in many instances these poles have necessarily to be hauled a considerable distance, as they cannot always be found at hand. The effect of the wind upon poles of this height must necessarily be very great, and is found in practice to be so, and the consequence is that the hops are frequently whipped about so much as to destroy a considerable portion of the crop, and their being unsupported by each other leaves each pole to resist independently the action of the wind, instead of having the support of its fellows, and throws a very great leverage upon the supporting-earth in the hill of hops, thereby affecting the root as well as the top of the plant. The great height at which the fruit is borne when trained in this manner also makes the labor of gathering very much more considerable than by my apparatus for training. My improvement has been found in practice to obviate these difficulties and furnish a cheap, economical, and satisfactory training for the hops, of great value to the farmer, and giving a better yield and a better quality of hops.

Having thus fully described my said invention, I claim—

An apparatus for training hops, reduced by the combination of a pole in each hill of the proper height only to support the hop to the bearing-point, with cords or twines, or their equivalent, connecting each of these poles with the poles of each adjacent hill, substantially as and for the purposes set forth.

FREDERICK W. COLLINS.

Witnesses:
CHARLES E. WING,
MARY S. WIDGE.